United States Patent
Hobson et al.

(10) Patent No.: US 6,366,996 B1
(45) Date of Patent: Apr. 2, 2002

(54) PAGE MEMORY MANAGEMENT IN NON TIME CRITICAL DATA BUFFERING APPLICATIONS

(75) Inventors: Richard Frederick Hobson, Coquitlam; Allan Robert Dyck, North Vancouver, both of (CA)

(73) Assignee: PMC-Sierra, Inc., Burnaby (CA)

( * ) Notice: Subject to any disclaimer, the term of this patent is extended or adjusted under 35 U.S.C. 154(b) by 0 days.

(21) Appl. No.: 09/489,917

(22) Filed: Jan. 24, 2000

(51) Int. Cl.[7] .............................................. G06F 12/00
(52) U.S. Cl. ...................................... 711/206; 711/170
(58) Field of Search .................. 711/170–172, 200–221

(56) References Cited

U.S. PATENT DOCUMENTS

| | | | |
|---|---|---|---|
| 3,768,080 A | 10/1973 | Boger et al. ................. | 711/207 |
| 4,403,283 A | 9/1983 | Myntti et al. .................... | 711/2 |
| 4,525,778 A | 6/1985 | Cane ........................... | 711/207 |
| 4,837,738 A | 6/1989 | Lemay et al. .................. | 406/14 |
| 5,255,384 A | 10/1993 | Sachs et al. .................. | 711/207 |
| 5,426,750 A | 6/1995 | Becker et al. ............... | 711/207 |
| 5,465,337 A | 11/1995 | Kong .......................... | 711/207 |
| 5,502,829 A | 3/1996 | Sachs .......................... | 711/207 |
| 5,699,539 A | 12/1997 | Garber et al. .................... | 711/2 |
| 5,752,274 A | 5/1998 | Garibay, Jr. et al. ........ | 711/206 |
| 5,752,275 A | 5/1998 | Hammond .................... | 711/206 |
| 5,781,922 A | 7/1998 | Braceras et al. ............. | 711/118 |
| 5,784,699 A | 7/1998 | McMahon et al. ........... | 711/171 |
| 5,802,604 A | 9/1998 | Stewart et al. ............... | 711/206 |
| 5,809,561 A | 9/1998 | Sheffield et al. ............. | 711/206 |
| 5,860,144 A | 1/1999 | Frank et al. .................. | 711/206 |
| 5,860,146 A | 1/1999 | Vishin et al. ................. | 711/207 |
| 5,864,867 A | 1/1999 | Krusche et al. ........... | 707/104.1 |
| 5,873,123 A | 2/1999 | Patel et al. ................... | 711/202 |
| 5,895,503 A | 4/1999 | Belgard ....................... | 711/202 |
| 5,897,660 A | 4/1999 | Reinders et al. ............. | 711/170 |
| 5,913,923 A | 6/1999 | Dunlap et al. ............... | 710/100 |
| 5,928,352 A | 7/1999 | Gochman et al. ........... | 712/200 |
| 5,930,827 A | 7/1999 | Sturges ........................ | 711/170 |
| 5,940,872 A | 8/1999 | Hammond et al. .......... | 711/207 |

Primary Examiner—Do Hyun Yoo
Assistant Examiner—Nasser Moazzami
(74) Attorney, Agent, or Firm—Oyen Wiggs Green & Mutala

(57) ABSTRACT

A primary objective of prior art memory management schemes is to provide rapid access to a table of used/free memory page addresses to facilitate location and allocation of the next available free page as quickly as possible (e.g. within a few hardware clock cycles). But it is not always essential to allocate new pages within the smallest possible number of hardware clock cycles. Furthermore, some tasks need not "see" (or access) more than a few pages (possibly as few as 1 or 2 pages) at a time. By exploiting these factors, the present invention facilitates management of a collection of pages using an address table containing the smallest possible number of bits (i.e. N bits for a memory divided into N pages). The invention also provides a method of accessing a small number of pages via simple multiplexed address selection. The invention is well suited to use in embedded chip applications which pass data through a set of data storage buffers, as is common in a packet switched network environment.

5 Claims, 3 Drawing Sheets

PAGE MEMORY MANAGEMENT IN NON TIME CRITICAL DATA BUFFERING APPLICATIONS

TECHNICAL FIELD

The present invention is directed to memory management in environments which do not require free memory pages to be located and allocated within the smallest possible number of hardware clock cycles, and do not require tasks to have access to more than a very few pages at one time. This facilitates memory management using an address table containing the smallest possible number of bits (i.e. N bits for a memory divided into N pages).

BACKGROUND

Memory management schemes typically divide a limited memory resource into small pieces, called "pages", which are shared by independent "tasks". Individual pages are dynamically assigned on demand for use by specific tasks. If a task no longer requires a particular page the task dynamically releases that page, freeing the page for use by other tasks. It is necessary to keep track of those pages which are free and those pages which are in use. It is also necessary to efficiently implement such schemes in hardware.

Prior art page memory management schemes commonly use "direct map", "partially associative lookup", or "fully associative lookup" page address translation methods. Conventionally, a "list", "stack", "table" or "collection" of addresses of available pages is kept. The collection is dynamically updated to provide a continuously current indication of the addresses of both free pages and in-use pages.

For example, in the direct map method, the collection consists of a series of two part logical addresses, as shown in FIG. 1. The upper (left most) part of each address is a "Logical Page Number" (LPN) specifying a particular Physical Page Number (PPN), and the lower (right most) part is an "Index" specifying a location within that page. In order to "bind" an LPN to a particular PPN, a translation memory (termed "Page Lookup" in FIG. 1) is used. Typically, if the available memory consists of a total of N pages, the Page Lookup translation memory contains exactly N entries for a one-to-one mapping between LPN's and PPN's, although it is possible to have more than N entries in a Page Lookup memory (e.g. to permit a larger address to be redundantly mapped into N pages). Note that this has nothing to do with the concept of "virtual memory", in which a much larger logical address can be bound to N pages. The present invention can however be generalized to encompass virtual memory management schemes.

The "partially associative lookup" method recognizes that if the logical addresses are large enough, it may be desirable to divide them into three parts rather than two (as is normally done in virtual memory management systems). The third part is called the "segment" portion of the address. This complicates the FIG. 1 Page Lookup memory, because it must be extended to store the correct physical segment number corresponding to each PPN. This scheme implies that there are more logical pages than physical pages. For faster address translation, the Page Lookup memory can be divided into M smaller blocks, each of which can be accessed in parallel. This allows simultaneous comparison (termed "associative lookup") of M physical segment values with the logical segment value to find a match. A priority encoder of the type described below can be used to select the correct matching values. Since not all physical segment numbers are simultaneously compared, the scheme is called "partially associative", and can be faster than purely direct mapped techniques. However, the present invention is directed to situations in which speed is not necessarily of the essence, so the complications of three part logical addresses and associative lookup techniques can be avoided.

The "fully associative lookup" method extends the partially associative lookup method to perform a simultaneous comparison of the combined segment and LPN portions of an address. Instead of involving a table lookup operation, this employs a fully associative or "content addressable" address translation method. It is not necessary to further explain the complexities of this technique, because they too can be avoided by employing the present invention.

A primary disadvantage of prior art page address translation schemes is that the collection of addresses of available pages consumes much more memory than is absolutely necessary. This precludes use of prior art memory management schemes in applications in which memory is a scarce resource, such as applications embedded on a single integrated circuit chip. For example, if the available memory consists of a total of N pages, then an address table comprising $N*Log_2N$ bits is required to implement page address translation via direct lookup in an address table. Implementation of page address translation via a free page list or stack also requires an address table comprising $N*Log_2N$ bits (i.e. N entries each having a width of $Log_2N$ bits).

A primary objective of prior art schemes is to provide rapid access to the collection to facilitate location and allocation of the next available free page as quickly as possible (e.g. within a few hardware clock cycles). However, it is not always necessary to allocate new pages within the smallest possible number of hardware clock cycles. Furthermore, some applications need not "see" (or access) more than a few pages (possibly as few as one or two pages) at a time. By exploiting these factors, the present invention facilitates management of a collection of pages using an address table containing the smallest possible number of bits (i.e. N bits for a memory divided into N pages). The invention also provides a method of accessing a small number of pages via simple multiplexed address selection. The invention is well suited to use in embedded chip applications which pass data through a set of data storage buffers, as is common in a packet switched network environment.

SUMMARY OF INVENTION

The invention provides a method of finding, within K clock cycles, a next free page contained within an N page memory. An N-bit UF Table is provided. Each bit is either zero, indicating that a corresponding memory page is in use; or, non-zero, indicating that the corresponding page is free for use. The UF Table is divided into K separate entries, each containing M=N/K bits. Upon receipt of a request for the next free memory page, the UF Table bits are sequentially examined to detect the first non-zero bit. If a non-zero bit is detected, that bit's position within the UF Table is returned as an output value. If no non-zero bit is detected, an error indication is returned as the output value.

After each UF Table bit is examined, a counter value is incremented by one. The output value is obtained by concatenating the counter value with a bit position value representative of the position of the detected bit within the UF Table entry corresponding to the counter value.

The next free page is allocated for use by overwriting the detected bit with a value of zero to indicate that the next free page is in use.

An address specifier is provided to identify a plurality of addressable memory locations. The address specifier includes a page specifier for specifying one page within a contiguous group of the in use pages. This facilitates switching from an addressable location on one page within the contiguous group to an addressable location on another page within the contiguous group by incrementing the page specifier.

The invention further provides a method of deriving a physical memory address from an address specifier which identifies two or more of the physical memory addresses. The address specifier comprises a lower order bit index, one or more overflow bits in bit positions next most significant to the lower order bit index, and two or more page specifiers. The two or more page specifiers are multiplexed to select the one which corresponds to the value of the over-flow bits. The selected page specifier is then concatenated with the lower order bit index to produce the physical memory address.

DESCRIPTION

Figure 1:
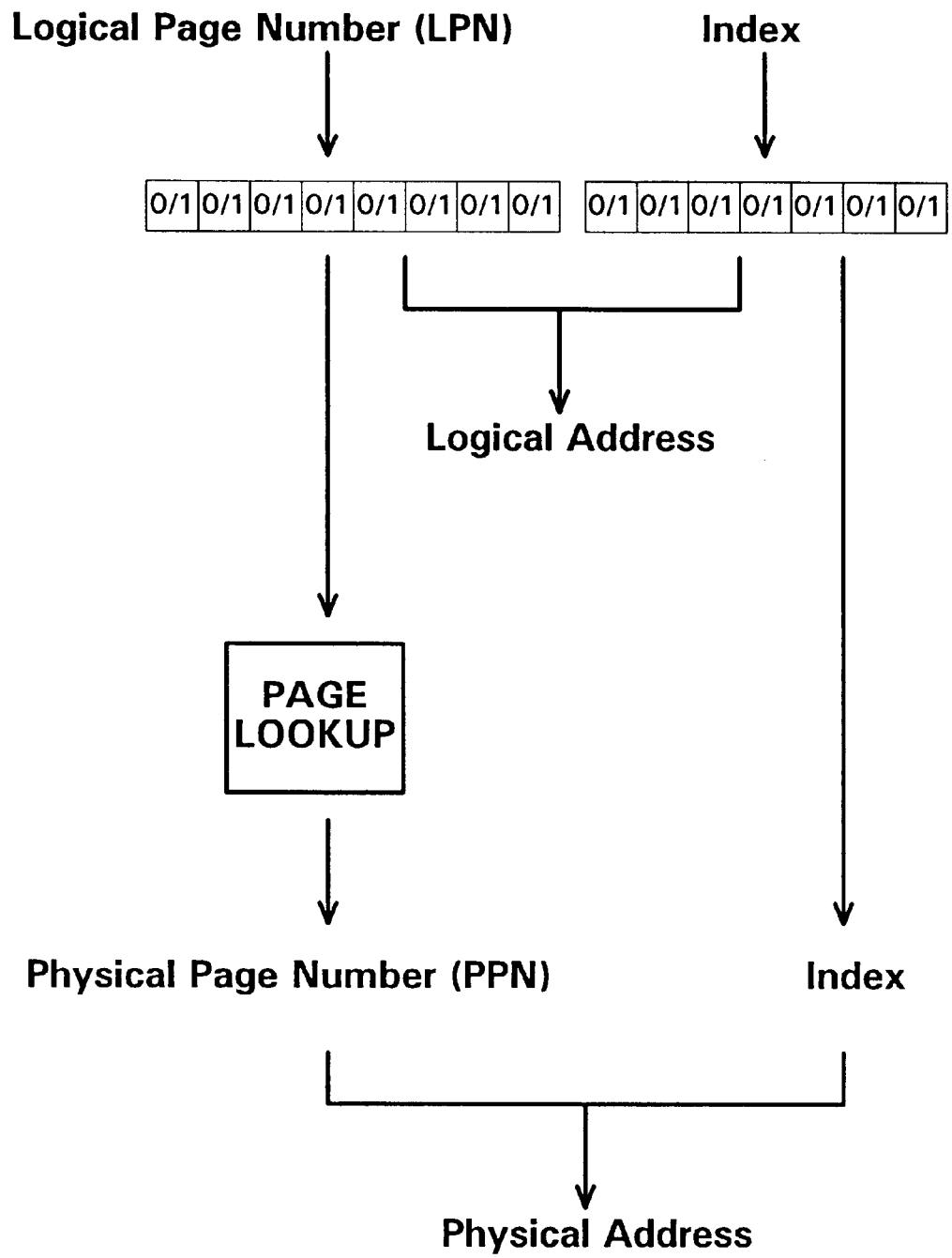
FIG. 1 is a block diagram representation of a prior art direct map page address translation scheme in which logical addresses are translated directly into physical addresses.
Figure 2:
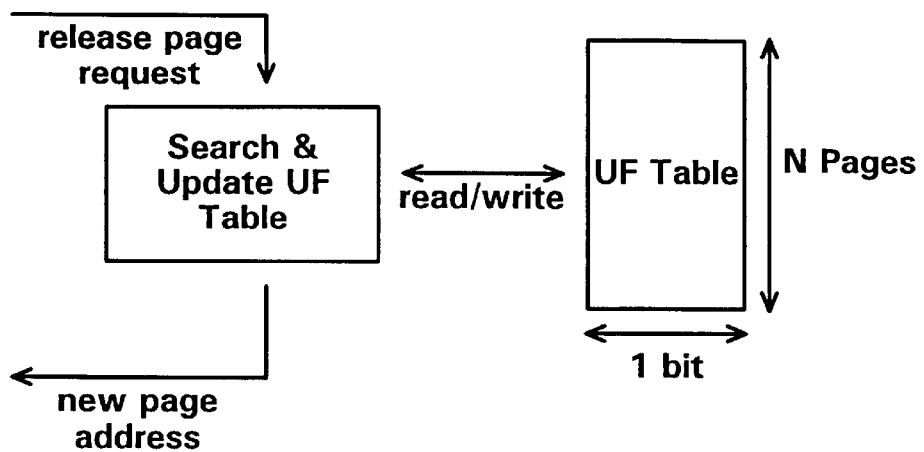
FIG. 2 is a block diagram representation of a free page memory management scheme in accordance with the present invention.

The most efficient method of keeping track of the state of a collection of memory pages is to use a single bit to indicate the used or free ("UF") status of each page. If the pages are visualized as a sequential collection, the position of a UF bit in a table of UF bits (the "UF Table") provides not only the address of the UF bit in the UF Table, but also provides an index pointer to the address of the corresponding page in the memory system. FIG. 2 illustrates such a UF Table, namely a 1 bit wide by N entry long table, corresponding to an available memory consisting of a total of N pages.

Assume that a small number, K, of hardware clock cycles are available within which one must either find the next free page, or find a particular page that is in use. (K is selected to be a power of two. For example if the actual number of available hardware clock cycles is 40, then one could select K=32, or K=16, etc.) Finding the next free page is more time consuming, because this requires a search. A fast direct lookup can be used to find a particular page that is in use, because one will have a priori knowledge of the address of the page in question.

Figure 4:
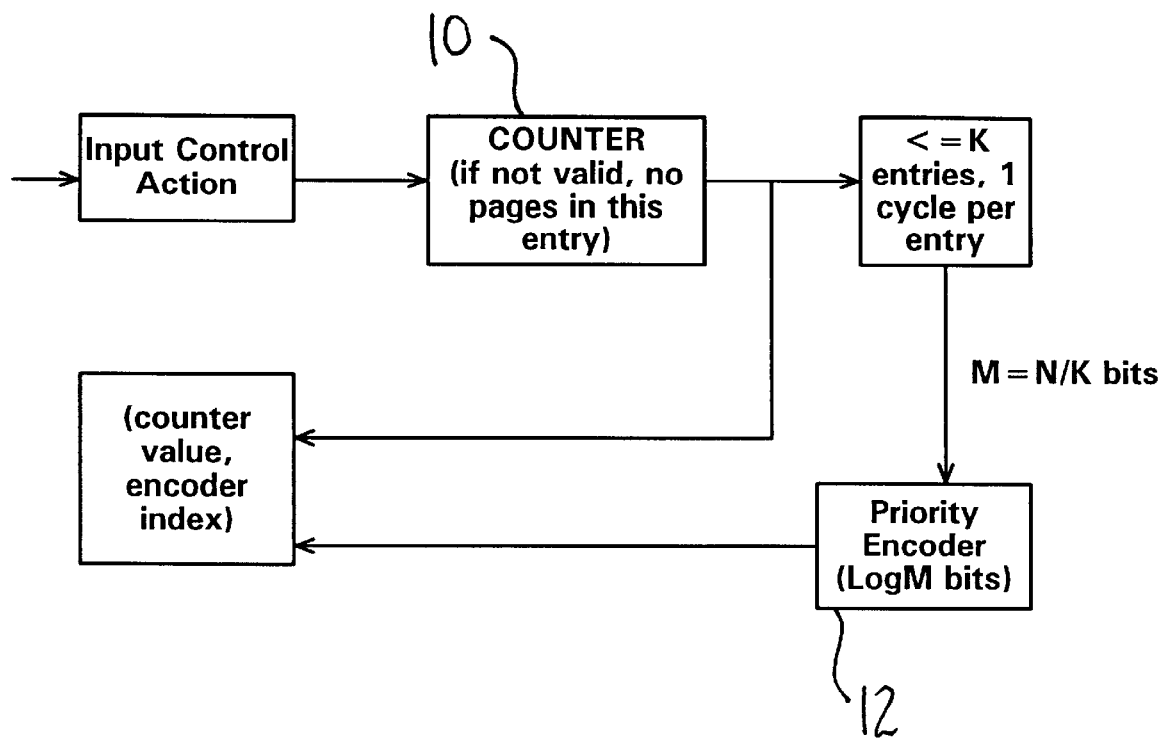
FIG. 4 is a block diagram representation of an efficient method for locating free pages in accordance with the invention.

To find the next free page within K cycles, the UF Table is divided into a total of K entries, each containing M=N/K bits, where N is the total number of pages. All K entries in the UF Table are then sequentially accessed using a counter 10, as indicated in FIG. 4. For each entry, a "priority encoder" 12 or "find-first-one" circuit is used to detect the next free page. Such circuits consist of well known combinational logic for locating the position within a bit string of the first bit having a value of one (or zero, if negative logic is used) and returning the position of the located bit. The page address of the free page is then given by concatenating the counter value with the position of the first one-bit located in the UF Table (assuming that a bit value of one in the UF Table is used to denote free pages; searching for ones or zeroes is logically equivalent).

To illustrate the foregoing, suppose that the available memory is divided into N=512 (i.e. $2^9$) pages and that the actual number of available hardware clock cycles is 40, with K=32 being selected. Accordingly, M=N/K=512/32=16. The UF Table is therefore divided into K=32 entries, each having 16 bits. Assume that the next free page is that corresponding to the bit at position 89 in the UF Table (i.e. the bits at positions 0 through 88 each have a value of zero denoting that all of those pages are in use, and the bit at position 89 has a value of one denoting that page is free). The 89th bit is in the sixth one of the 16-bit entries, so the counter value is five when the 89th bit is located (i.e. counter 10 increments from zero). Further, the 89th bit is in the ninth bit position within the sixth one of the 16-bit entries. A five bit wide field is needed to store each of the K possible counter values (i.e. $0 \leq K \leq 31$) and another four bit wide field is needed to store each of the possible values of M (i.e. $0 \leq M \leq 15$). Hence, the aforementioned concatenation operation produces a nine bit wide field which, in this particular case, yields the binary value 001011001, with the five higher order bits 00101 representing the counter value of K=5, and the four lower order bits 1001 representing the ninth bit position of the located bit within the entry identified by counter 10.

The total number of entries in the UF Table need not be an exact power of 2. However, if the total number of entries in the UF Table is not an exact power of 2, then each of the K entries in the UF Table must consist of a number of bits which is an exact power of two. Alternatively, if the total number of entries in the UF Table is an exact power of 2, then the number of bits per entry need not also be an exact power of two. The lower part of the concatenated address must be formed from a power of 2 (to avoid gaps in the address space), so the address parts can be interchanged if necessary to meet this requirement (i.e. the concatenation operation could leave the counter value in the lower order bits of the concatenated output value, and leave the bit position of the located bit within the entry identified by priority encoder 12 in the higher order bits of the concatenated output value).

The UF Table can be managed by a state machine having a small number of control inputs to select from, e.g. "get next page address", "free given page address", "initialize UF Table". Initialization can conveniently be done M bits at a time. For example, the initialization control input could be repeated for each counter value to initialize the entire UF Table. Variations on this could be for example to allocate two pages under special circumstances. The state machine could keep the addresses of the next one or two free pages readily available, for rapid allocation of free pages when a request is actually received.

As an example, to free up a given page in the UF Table, the requesting agent supplies a page number which can be considered to have the format ccccceeee, with the five c's representing the five higher order bits constituting the counter value in the foregoing example, and the four e's representing the four lower order bits constituting the encoder value in the foregoing example. The state machine that implements all control actions must load counter 10 with the value ccccc (or bypass counter 10 and go straight to the UF Table). The selected UF Table entry is read out and the value eeee is then used to set the appropriate bit in the selected table entry. The whole entry must then be written back into the UF Table. This action can be thought of as a read-modify-write action.

The invention can save a large order of magnitude in table memory, which is an expensive resource in a custom integrated circuit. Applications such as packet switched networks typically have a "packet-time" between resource requests. This can easily add up to 32 or more hardware clock cycles, in which case the value of K could be 32 or greater.

A complementary aspect of the invention's memory management scheme is the address translation methodology. It is assumed that no application will require access to more than a small number of pages at one time, say 1 to 4 pages. In this case, the hardware can be designed in such a way that all physical page addresses can be "carried" together with the "logical" address (a "PL-address"). The uppermost 1 or 2 bits of the logical address can then be used to control a multiplexer ("mux" in FIG. 3), which dynamically selects the proper page, or physical, address from those that are included in the PL-address. The page select bits are an extension of the Page Index.

Figure 3:
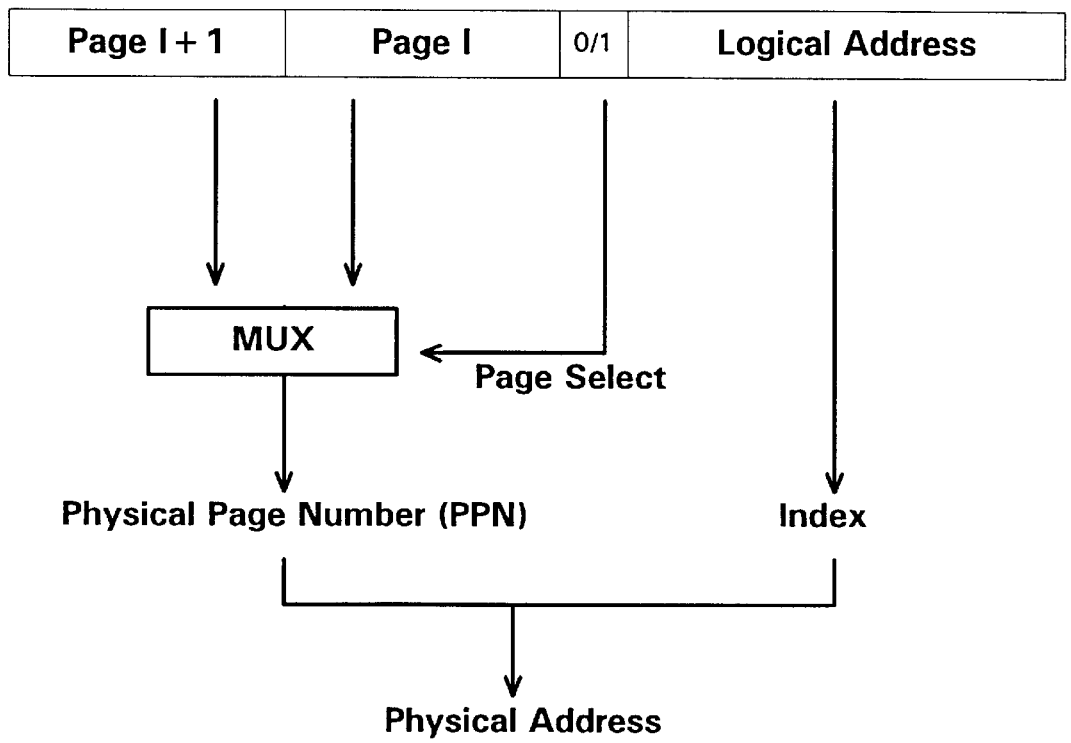
FIG. 3 is a block diagram representation of a page address translation scheme in accordance with the invention.

For example, suppose that each page contains 128 entries (words), such that the page "index" field requires 7 bits. Also suppose that the available memory is divided into N=256 (i.e. $2^8$) pages so the logical page number field requires 8 bits. If we use a 24 bit address field, the lower 7 bits are occupied by the aforementioned index, and two page numbers (i.e. those corresponding to "Page I" and "Page I+1", as shown in FIG. 3) occupy the upper 16 bits. This leaves one bit free for use as a "Page Select" bit, as shown in FIG. 3.

Conceivably, data may straddle the boundary between two pages, causing the page index to "overflow" by one bit. For example, suppose data is organized as 12 word entries (packets) in the memory. Because 12 is not a power of two, the last block on a page will spill over onto the next page. In hexadecimal notation, one might have a starting address such as 030778 (upper page 3, second page 7, page index 120). As we sequence through the 12 word packet, at word 9, the address table entry is: 030780, where the extra index bit signals a switch from page 07 to page 03. The last word in the packet has address: 030783. The next time a packet is sequentially accessed, the address would be: 030304, denoting that page 07 has been replaced by page 03, with no new page having been requested. A support function which could be provided by a suitable search and update UF Table agent is the repositioning or updating of page entries (e.g. 0307 being replaced by 0303) in the upper portion of an address. Note that it is not strictly necessary to have the capability to "overflow" bits in the address field itself. If the packet is treated as a complete entity by the memory interface then the address can be dynamically expanded to account for the overflow bit (or bits).

As will be apparent to those skilled in the art in the light of the foregoing disclosure, many alterations and modifications are possible in the practice of this invention without departing from the spirit or scope thereof. For example, the appended claims mention usage of a "value of zero" for one purpose and usage of a "value of one" for another purpose. Persons skilled in the art will understand that one could alternatively employ a reverse logic scheme in which "a value of zero" was used for the "other" purpose and in which "a value of one" was used for the "one" purpose. Accordingly, the scope of the invention is to be construed in accordance with the substance defined by the following claims.

What is claimed is:

1. A method of finding, within K clock cycles in a system having X hardware clock cycles where K is a power of two less than X, a next free page contained within an N page memory, comprising:

(a) providing a UF Table containing a total of N bits, each one of said bits having either:
      (i) a value of zero to indicate that a corresponding one of said pages is in use; or,
      (ii) a value of one to indicate that said corresponding page is free for use;
   (b) dividing said UF Table into K separate entries, each of said entries containing M=N/K bits;
   (c) upon receipt of a request for said next free page, sequentially examining said UF Table bits to detect a first one of said bits having a value of one while incrementing a counter value by one after examining each one of said UF Table bits;
   (d) if one of said bits having a value of one is detected, providing an output value by concatenating said counter value with a bit position value representative of the position of said detected bit within said UF Table entry corresponding to said counter value; and,
   (e) if no one of said bits having a value of one is detected, providing an error indication as said output value.

2. A method as defined in claim 1, further comprising allocating said next free page for use by a user, said allocation comprising overwriting said detected bit with a value of zero to indicate that said next free page is in use.

3. A method as defined in claim 2, further comprising providing an address specifier for identifying a plurality of addressable locations within said memory, said address specifier including a page specifier for specifying one page within a contiguous group of said in use pages, said method further comprising switching from an addressable location on one page within said contiguous group to an addressable location on another page within said contiguous group by incrementing said page specifier.

4. A method as defined in claim 3, further comprising providing a page selector coupled in higher order proximity to said address specifier, wherein said switching further comprises overwriting said page selector with a predetermined value.

5. A method as defined in claim 3, further comprising providing a page selector coupled in higher order proximity to said address specifier, wherein said incrementing said page specifier overwrites said page selector by overflow from said page specifier into said page selector.

* * * * *